United States Patent [19]

Kawahara

[11] Patent Number: 5,027,234
[45] Date of Patent: Jun. 25, 1991

[54] SYSTEM FOR DETECTING A REFERENCE TRACK OF A DISC STORAGE UNIT

[75] Inventor: Yuuji Kawahara, Kawasaki, Japan
[73] Assignee: Fuji Electric Co., Ltd., Kawasaki, Japan
[21] Appl. No.: 275,772
[22] Filed: Nov. 17, 1988
[30] Foreign Application Priority Data Dec. 10, 1987 [JP] Japan .................. 62-312563

[51] Int. Cl.$^5$ .......................... G11B 5/596; G11B 5/55
[52] U.S. Cl. .................. 360/77.08; 360/78.14
[58] Field of Search ............... 360/77.01, 77.02, 77.07, 360/77.08, 78.14, 75

[56] References Cited

U.S. PATENT DOCUMENTS

| 4,683,504 | 7/1987 | Cantello et al. | 360/78.14 |
| 4,685,007 | 8/1987 | Nazarian et al. | 360/78.14 |
| 4,745,497 | 5/1988 | Ozawa | 360/77.07 |
| 4,875,114 | 10/1989 | Moteki | 360/77.08 |
| 4,884,152 | 11/1989 | Ide | 360/78.14 |

FOREIGN PATENT DOCUMENTS 62-38574 2/1987 Japan .

Primary Examiner—Aristotelis M. Psitos
Assistant Examiner—Steven R. Garland
Attorney, Agent, or Firm—Spencer & Frank

[57] ABSTRACT

A read/write head which is usually used for reading out and writing information from and into the surface of the disc and the servo information recorded on the disc as a position sensor. Servo information to be recorded on a surface of a disc to detect the deviation of the head from a normal position of each track is formed by a plurality of servo information portions and the servo information regarding to a reference track is made different from the servo information of other tracks. A plurality of numerical values indicative of the servo information portions are detected from the signal read out by the head. In accordance with the detected values, the reference track is designated.

9 Claims, 6 Drawing Sheets

SYSTEM FOR DETECTING A REFERENCE TRACK OF A DISC STORAGE UNIT

BACKGROUND OF THE INVENTION

1. Field of the Invention

The present invention relates to a reference track detection system for a disc storage unit, such as a fixed disc storage unit, and more particularly, to a reference track detection system for detecting a reference track based on which a read/write head is then displaced and positioned at each of a number of tracks defined on one or both surfaces of a hard disc, so that the read/write head reads and writes information to and from each track.

2. Description of the Prior Art

In a disc storage unit, as is well known to those skilled in the art, a read/write head must be correctly positioned at a specific track before information or data is read out or written into a specific track on the surface of a disc. The displacement of the head is carried out by driving an actuator. In order to properly position the head at a specific track, it is necessary that the actuator be instructed as to which direction and to what extent the head must be displaced. To this end, for instance, track numbers, which are generally called cylinder numbers, are sequentially assigned to all the data tracks on one surface of the disc. In response to the difference in cylinder number between a track at which the head is positioned at present and a specific track to which the head is to be positioned subsequently, a direction in which the head must be displaced and an amount e.g. the number of tracks by which the head must be displaced, are computed. The disc storage unit always stores therein the cylinder number of the track at which the head is positioned at present. After the head is displaced to the desired position, a new cylinder number is stored into the disc storage unit while the old cylinder number is erased.

When the disc storage unit is de-energized, however, the data of the present position of the head is destroyed. In addition, the head position is not definite when the disc storage unit is energized again, so that the stored data of the head position must be set to a correct value. In order to set the stored data at such a correct value, one specific track of a number of tracks defined on one surface of a disc, is defined as a reference track. At any required time, such as the time that the disc storage unit is started, the head is first displaced to the reference track, and then the stored data representing the present position of the head is initialized to the cylinder number assigned to the reference track. A specific track of a number of data tracks (in most cases, the No. 0 track on the outermost radius) is defined as the reference track. Alternatively, a track adjacent to the data track, and independent of the data track, is defined as a reference track.

However, when the head is displaced to the reference track in order to initialize the above-mentioned stored data of the cylinder number, it is necessary that the proper position of the head at the reference track be detected by suitable means. For this purpose, a head position sensor is incorporated into the disc storage unit. As the head position sensor, a so-called photo-interrupter has been used in general. As is well known to those skilled in the art, the position sensor detects the position of an object in response to variations of interrupted conditions of an extremely narrow light beam when an object moves across the light beam. The photo-interrupter is incorporated into the disc storage unit in such a way that the photo-interrupter can directly detect the position of the head, can detect the position of the head through a movable carriage upon which the head is mounted, or through a small member attached to the carriage.

The position sensor, and especially the photo-interrupt of the type described above used for the detection of the reference track, can detect whether or not the head is properly positioned on the reference track with a high degree of accuracy by sufficiently narrowing the cross section of the light beam, but has the drawbacks that such an accurate photo-interrupter is very expensive, and it takes a long time to adjust and install the position sensor in the disc storage unit.

With respect to a disc storage unit, there has always been an increasing demand for making the disc storage unit more compact in size, and for increasing its storage capacity. In order to meet such needs, there is no choice but to decrease the distance between adjacent tracks as much as possible, thereby increasing the storage capacity. It follows, therefore, that the position sensor is required to have high accuracy, on the order of a few microns or more. As a result, the cost of a position sensor and its associated intergrated circuit becomes inevitably high. Furthermore, since the disc storage unit must be more compact in size, there also arises the problem how to find space for the installation of the position sensor. Moreover, in the case of a highly accurate position sensor, the position sensor must be assembled with a high degree of precision. To this end, extremely fine adjustment of the position of the position detector within a narrow space must be accomplished, and accordingly adjustment becomes extremely difficult, resulting in increased cost for installation and position adjustment of the position sensor in excess of the price of the position sensor and its associated intergrated circuit. In addition, with the increase of an accuracy of the position sensor, there arises a further problem in that the operation of the position sensor is likely to become sensitive to vibration, oscillation and impact.

The above-described fundamental problems cannot be solved as long as a position sensor such as the photo-interrupter is used to detect the reference track.

SUMMARY OF THE INVENTION

It is, therefore, an object of the present invention to provide a reference track detection system which solves substantially all of the above and other problems encountered in a conventional position sensor.

It is another object of the present invention to provide a reference track detection system which completely eliminates the use of a conventional position sensor and correctly detects a reference track by utilizing a read/write head which is usually incorporated in a disc storage unit.

In order to achieve the above and other objects, according to the present invention, servo information to be recorded on a surface of a disc to detect the deviation relative to the head from a normal position of each track is formed by a plurality of servo information portions and the servo information relating to a reference track is made different from the servo information of other tracks. A disc storage unit comprises servo information detection means for detecting a plurality of numerical values from the signal read out by the head, each value forming a portion of the servo information and means responsive to the plurality of numerical values thus detected for discriminating the reference track from other tracks to specify the reference track. Furthermore, the disc storage unit may comprise means for detecting a deviation of the head from a normal position of each track in accordance with the plurality of numerical values thus detected.

More specifically, the present invention provides a system for detecting a reference track on which a read/write head, for reading out and writing data information to and from a plurality of tracks defined on a surface of a disc storage unit, is moved to each of the plurality of tracks, the system comprising:

servo information consisting of a plurality of servo information portions written on the surface of the disc, the content of a part of the servo information with regard to the reference track being different from the content of the remaining part of the servo information with regard to the remaining tracks so that a deviation of the read/write head from a normal position of each track is detected;

servo information detecting means for detecting a plurality of numerical values representative of the contents of the plurality of servo information portions of the servo information from the read-out signal read out from the read/write head; and reference track designating means for discriminating the reference track in accordance with the plurality of numerical values detected to designate the reference track.

Here, the system may further comprise deviation detecting means for detecting deviation of the read/write head from the normal position of each track in accordance with the plurality of numerical values detected.

The reference track may be defined in data tracks for recording the data information.

The plurality of servo information portions may be distributed and spaced apart from each other in the circumferential direction of the surface of the disc.

The plurality of servo information portions may be arranged on the same surface of the disc.

The plurality of servo information portions may be formed by two servo information portions.

The reference track may be defined independently of the data tracks for recording data information.

The reference track may be arranged adjacent to one of the data tracks.

As is apparent from the above-described arrangement, the present invention utilizes both the read/write head, which is usually used for reading out and writing information to and from the surface of the disc, and the servo information recorded on the disc as a position sensor. As is well known to those skilled in the art, the servo information is recorded on the surface of the disc in order to detect a deviation of the head from the normal position thereof on each track, and is generally classified into two types of servo information; i.e., servo-surface servo information recorded on a disc surface exclusively allotted to the servo information, and data-surface servo information stored on the disc surface where, by interrupting the data tracks the data tracks are defined. When the present invention is carried out, either of the above-described types of servo information may be used, but in order to detect the reference track, the contents of the servo information recorded in the reference track must be different from the servo information recorded on the surface of the disc other than the reference track, so that in response to the signal read out through the head, the reference track can be judged.

The servo information detecting means which is one of the component parts of the present invention as described above, has the function of detecting a deviation of the head from the normal position with respect to each track in response to the servo information read out. The read-out signal of the servo information recorded on the reference track is also received by the servo information detecting means in the same manner as the read-out signal of the servo information recorded on other tracks. Accordingly, the detection output derived from the servo information detecting means, in response to the servo information read out from the reference track, must be made different from the output derived from the servo information detecting means in response to servo information read out from the other tracks.

In order to make the detection output signal obtained from the servo information read out from the reference track distinctly different from the detection output signal obtained from the servo information read out from the other tracks, according to the present invention, the servo information for each track consists of a plurality of servo information portions, generally two servo information portions. As described above, the servo information consists of a plurality of servo information portions and, in addition, the contents of at least one of the servo information portions recorded on the reference track is made very distinctly different from the contents of the servo information for other tracks. For instance, in the simplest case, each servo information is formed by two portions, into one of which no servo information is written. As a result, erroneous operation of the servo information detecting means can be prevented. Generally, the servo information detecting means has the function of detecting a signal or a numerical value representative of a deviation of the head from the normal position with respect to each track. In the present invention, the servo information detecting means receives the read-out signal of the servo information consisting of a plurality of portions, so that the numerical values representative of the contents of the respective portions of the servo information are detected separately by the servo information detecting means.

It follows, therefore, that in the present invention, at least one numerical value, of a plurality of detected numerical values concerning the reference track is clearly different from the detected numerical values of the other tracks. The present invention utilizes the above-described fact to discriminate the reference track from the other tracks, easily and reliably in accordance with a combination of a plurality of detected numerical values, thereby specifying or detecting the reference track. It is, of course, possible to detect a deviation of the head from the normal position with respect to another track in accordance with the plurality of numerical values. Thus, according to the present invention, the above-described objects can be attained without making construction of the disc storage unit more complicated, as compared with the conventional disc storage units, and by eliminating the position sensor of the type described above.

Furthermore, according to the present invention, the reference track can be defined independently of a data track, or one of the data tracks can be designated as the reference track. In the latter case, in order to detect the deviation of the head positioned on the reference track from the normal position, it is preferable that the servo information is formed by a plurality of (for example, two) servo information portions distributed in the peripheral direction of the surface of the disc, so that the content of same as the servo information for the other tracks is recorded in all the areas of one of the two portions.

The above and other objects, effects, features and advantages of the present invention will become more apparent from the following description of embodiments thereof, taken in conjunction with the accompanying drawings.

DETAILED DESCRIPTION OF PREFERRED EMBODIMENTS

Figure 1:
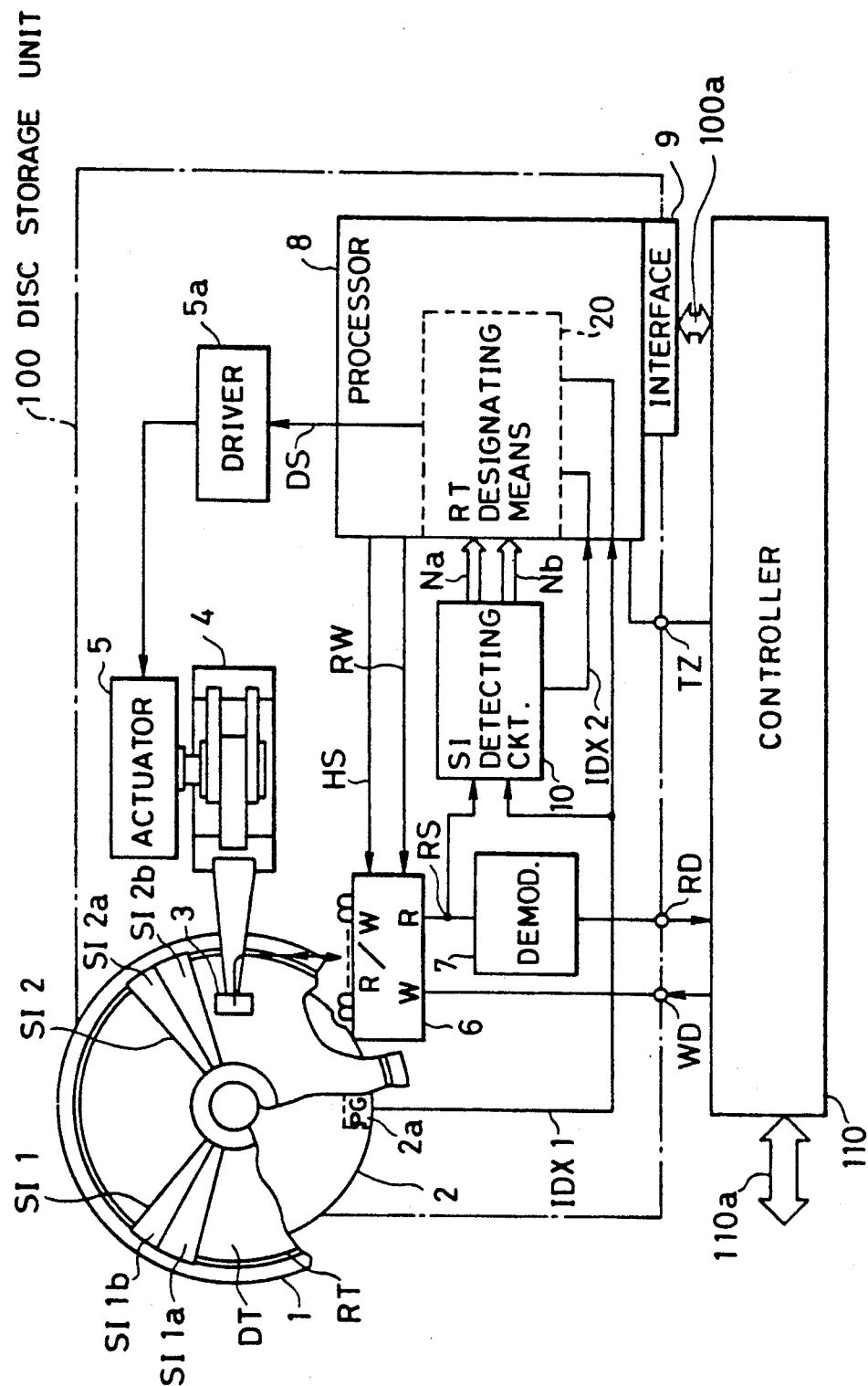
FIG. 1 is a block diagram showing an embodiment of a disc storage unit embodying a reference track detecting system in accordance with the present invention together with a controller therefor.

FIG. 1 shows one embodiment of an arrangement of a disc storage unit employing a reference track detecting system in accordance with the present invention. As is apparent from FIG. 1, the disc storage unit is a hard disc drive unit employing the data-surface servo information system.

Referring now to FIG. 1, reference numeral 100 designates a disc storage unit in general, which is indicated by a dash-and-dotted line and is connected through a controller 110 in the form of a microprocessor shown in the lower portion in FIG. 1, to a computer (not shown). A disc 1 schematically shown in the left hand upper portion in FIG. 1, is rotated at a predetermined rotational speed by a spindle motor 2 as is the case of a conventional disc storage unit. Of a plurality of data tracks DT defined on one surface of the disc, the radially outermost (No. 0 track T0) is selected as a reference track RT. As for the servo information, a first servo information portion SI1 and a second servo information portion SI2 are written into the respective surfaces of the disc 1 such that the first and the second servo information portions (SI1 and SI2) are spaced apart from each other. Here, the first servo information portion SI1 consists of two portions SI1a and SI1b, while the second servo information portion SI2 consists also of two portions SI2a and SI2b.

Figure 2:
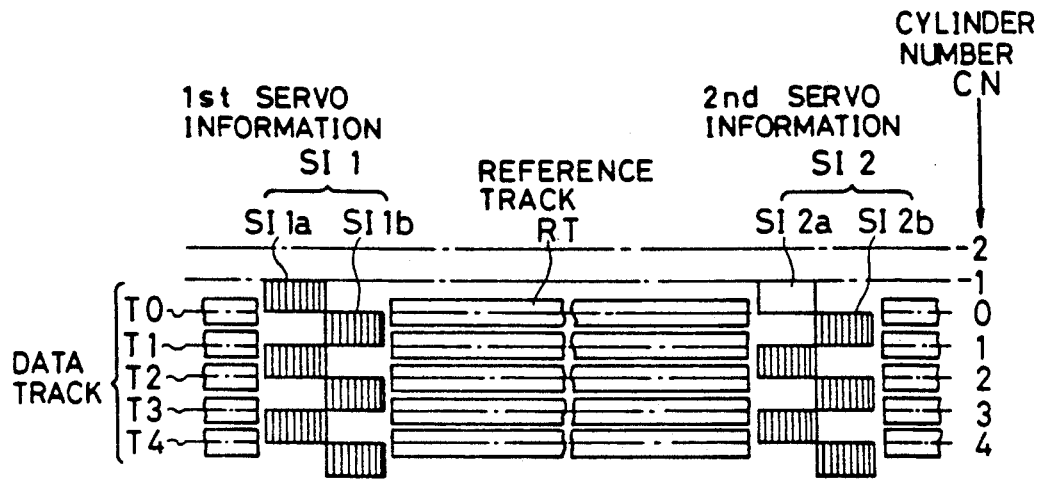
FIG. 2 is a partial development view showing a part of a disc surface to explain an example of the recording of servo information.

FIG. 2 is a development view showing a detail of the servo information. In FIG. 2, five data tracks T0-T4 are shown and two imaginary tracks with the cylinder numbers CN= -1 and -2 are shown radially outward of the data tracks DT by dash-and-dotted lines. The first and second servo information portions SI1 and SI2 have the same pattern and are arranged in the radial direction by partially interrupting the tracks in the rotational circumferential direction. The two servo information components SI1a and SI1b of the first servo information portion SI1 are recorded in a zig-zag form; that is, they are staggered from each other in both the radial and rotational directions. Each of the servo information components SI1a and SI1b is recorded and deviated from the center line of the adjacent track in the radial direction by a distance equal to ½ pitch between the adjacent tracks in the radial direction. As a result, each track is provided with two servo information components. As best shown in FIG. 2, each servo information component has a content consisting of about one hundred repetitive patterns, each consisting of a simple combination of "0" and "1" portions on the order of 100, as schematically shown by short vertical lines in FIG. 2. All the servo information components SI1a and SI1b of the first servo information portion SI1 have the same content, but one (in this case, SI2a) of the two servo information components SI2a and SI2b of the second servo information portion SI2 for the reference track RT (or the No. 0 track T0) has a blank content as indicated by a blank portion shown in FIG. 2. As is easily understood from FIG. 2, the first servo information portion SI1 for the reference track RT is used to detect a deviation of a read/write head 3 from its normal position, while the second servo information portion SI2 is used to detect the reference track RT itself.

Referring back to FIG. 1, the read/write head 3 for reading out and writing all information, including the servo information, is mounted on a carriage 4 movable in the right hand and left hand directions in FIG. 1. The carriage 4 is mechanically closely coupled to an actuator 5, so that in response to the energization of the actuator 5, the position of the carriage 4 in the radial direction of the disc 1 is changed. The actuator 5 is connected to a driving circuit 5a. All the heads 3 of the disc storage unit are connected to a read/write circuit 6 (shown below the head 3) and the head 3, which is selected in response to a head selection instruction HS, which is received by the read/write circuit 6 from a processor 8, is switched into the read mode or the write mode in accordance with the read/write instruction RW derived from the processor 8. The write data WD in the form of a predetermined modulation system, which is supplied from the controller 110 to the disc storage unit 100, is directly applied to the write input terminal W of the read/write circuit 6. The read-out signal RS, in the form of an analog waveform supplied from the read-out output terminal R of the read/write circuit 6, is demodulated by a demodulator 7 into the read-out data RD of the same modulation system. Then, the demodulated read-out data RD is transmitted from the disc storage unit 100 to the controller 110.

Reference numeral 10 denotes a servo information detecting circuit, which receives the above-mentioned read-out signal RS and the first index pulse IDX1, generated by a pulse generator 2a incorporated into the spindle motor 2, every time that the disc 1 makes one rotation. The first servo information SI 1 is written at a position which is in synchronism with the first index pulse IDX1. In response to the first index pulse IDX1, the servo information detecting circuit 10 generates the second index pulse IDX2 at a position which is in synchronism with the second servo information SI 2. Also, in response to the read-out signal RS of the first and second servo information, the servo information detecting circuit 10 detects two numerical values Na and Nb, which will be described in more detail hereinafter with reference to FIG. 3.

The processor 8, shown on the right hand side of the servo information detecting circuit 10, can be a simple microprocessor incorporated into the disc storage unit 100 for accomplishing the overall control therein, and supplies the drive instruction DS to the driving circuit 5a of the actuator 5, and the head selection instruction HS and the read/write instruction RW to the read/write circuit 6. The processor 8 incorporates therein a reference track designating means 20, in the form of software and reads out the numerical values Na and Nb from the servo information detecting circuit 10 in synchronism with the first and second index pulses IDX1 and IDX2. In response to the read-out numeral values Na and Nb, the processor 8 detects a deviation of the head 3 from a normal position of a track and also detects whether or not the track on which the head 3 is positioned is the reference track TR. One example of the software of the reference track designating means 20 will be described in detail hereinafter with reference to FIG. 9. The processor 8 is connected via an interface circuit 9 and a bus 100a to the controller 110, which in turn is connected through another bus 110a to a computer (not shown).

Figure 3:
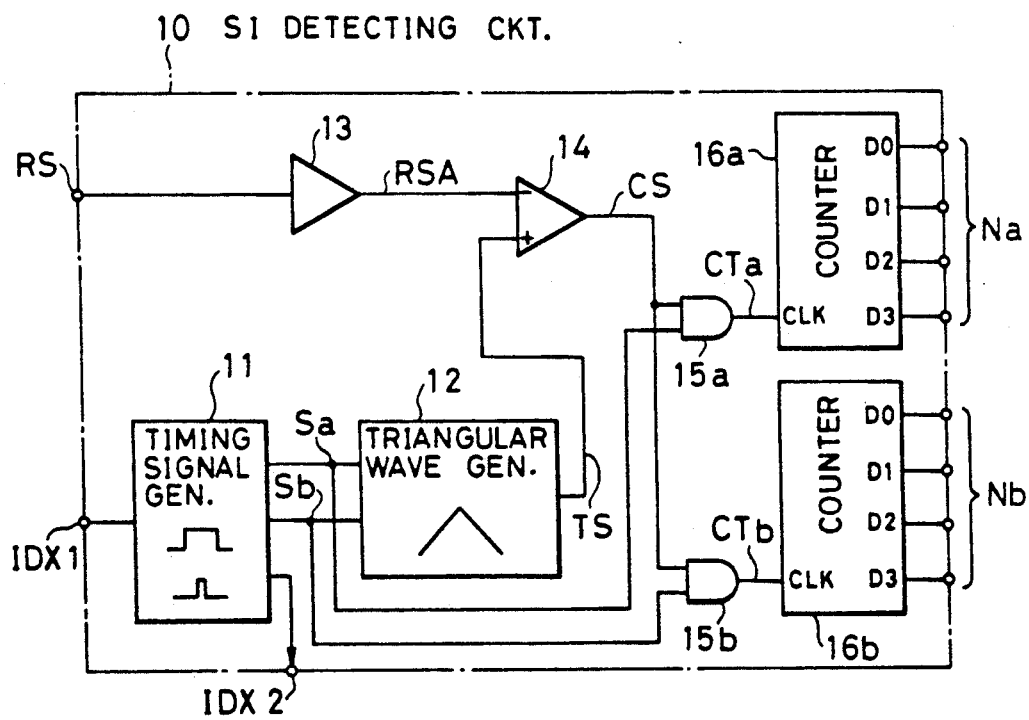
FIG. 3 is a block diagram showing one embodiment of a servo information detecting circuit.
Figure 4:
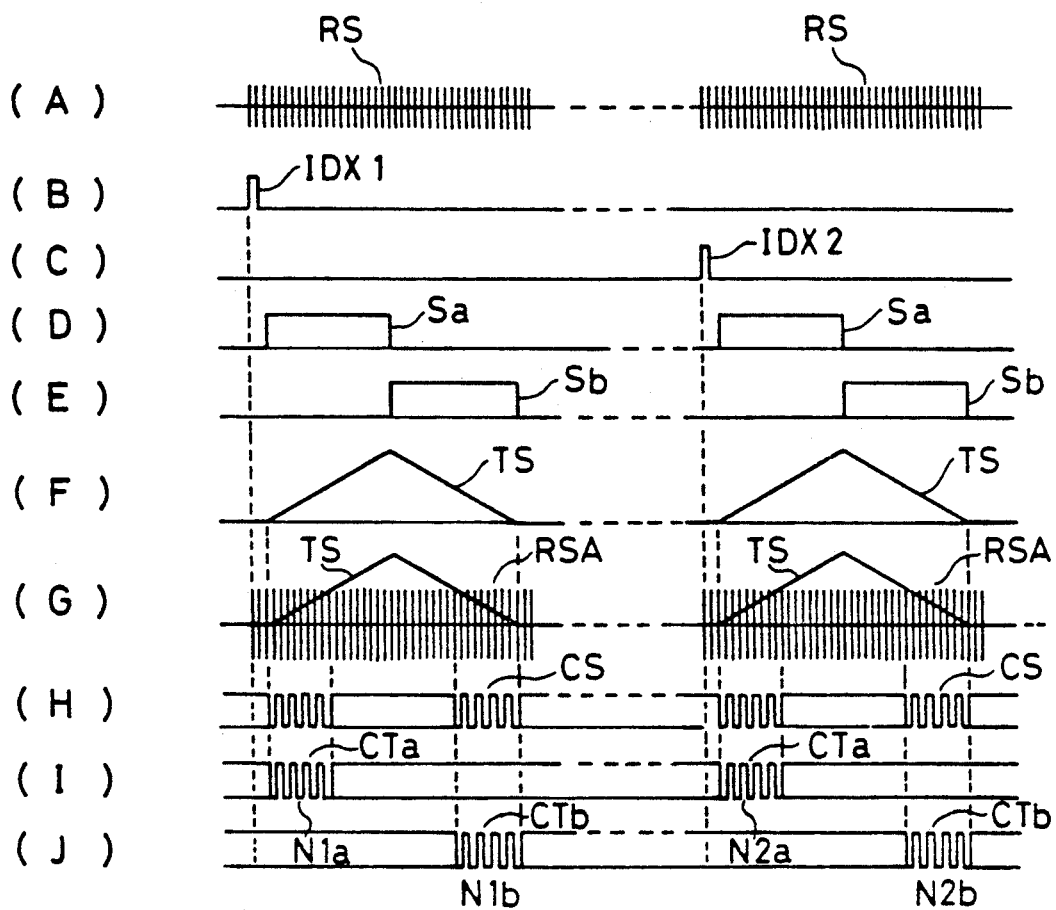
FIG. 4 illustrates waveforms of various signals associated with the servo information detecting circuit.
Figure 10:
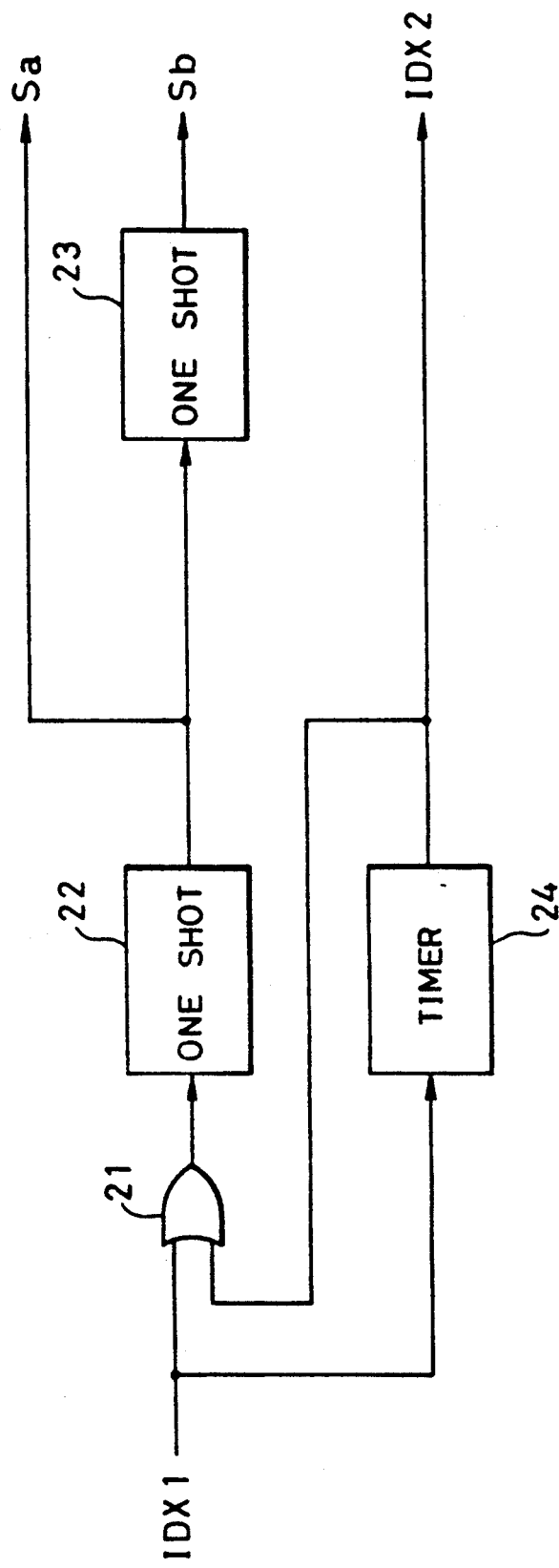
FIG. 10 is a logic circuit diagram showing a specific embodiment of a logic circuit incorporated in the timing signal generator 11 shown in FIG. 3.

FIG. 3 shows a specified embodiment of the servo information detecting circuit 10 and FIG. 4 shows the waveforms of the signals associated therewith. The input terminal of the servo information detecting circuit 10 always receives the read-out signal RS as shown by waveform (A) in FIG. 4 from the read/write circuit 6 and the first index pulse IDX1 as shown by waveform (B) in FIG. 4 from the pulse generator 2a of the spindle motor 2. A timing signal generator 11, which receives the first index pulse IDX1, can be constructed, for instance, with a combination of logic gates and counters as shown in FIG. 10. The timing signal generator 11 generates the second index pulse IDX2, which is in the form of a short pulse, in synchronism with the second servo information SI 2, as shown by waveform (C) in FIG. 4. The second index pluse IDX2 is supplied to the processor 8. The timing signal generator 11 further generates a first timing signal Sa, which has a pulse width substantially corresponding to the first halves SI1a and SI 2a of the respective two portions forming the first and second servo information SI 1 and SI 2, as shown by waveform (D) in FIG. 4, and a second timing signal Sb, which has a pulse width substantially corresponding to the second halves SI 1b and SI 2b of the respective two portions, as shown by waveform (E) in FIG. 4, in synchronism with both the first and second index pulses IDX1 and IDX2.

In FIG. 10, reference numeral 21 denotes an OR gate. Reference numerals 22 and 23 denote one-shot circuits, and reference numeral 24 denotes a timer. The first index pulse IDX1 is supplied to the OR gate 21 and the timer 24. The second index pulse IDX2 is derived from the timer 24 and is supplied to the OR gate 21. The OR output from the OR gate 21 is supplied to the one-shot circuit 22, from which a first timing signal Sa is obtained. This signal Sa is supplied to the one-shot circuit 23, from which a second timing signal Sb is obtained. Here, it is assumed that the one-shot circuits 22 and 23 operate at the trailing edge of their input pulse.

In response both to the first and second timing signals Sa and Sb, a triangular wave generator 12 generates a triangular ramp signal TS which rises in synchronism with the first timing signal Sa and falls in synchronism with the second timing signal Sb, as shown by waveform (F) in FIG. 4. The triangular wave generator 12 may be of any conventional circuit.

On the other hand, the read-out signal RS is supplied to an amplifier 13 so that the signal RS is amplified to a read-out signal RSA having a large amplitude as shown by waveform (G) in FIG. 4. The signal RSA is supplied to the inverting input terminal of a comparator 14, whose non-inverting input terminal receives the above-mentioned ramp signal TS. The read-out signal RSA and the ramp signal TS are compared with each other by the comparator 14 as shown by waveform (G) in FIG. 4 and as a result a comparison result signal CS as shown by waveform (H) in FIG. 4 is derived from the comparator 14. The read-out signal RSA includes positive peaks, the number of which is equal to the number of, for instance, "1"s in a repetitive series of "0"s and "1"s written as the servo information in the signal RSA, so that the comparison result signal CS includes pulses, the number of which is equal to the number of the peaks in the read-out signal RSA which exceeds the ramp signal TS.

Two AND gates 15a and 15b separate the pulses contained in the comparison result signal CS into the number belonging to the first half and the number belonging to the second half of the servo information, and these separated pulses are counted by counters 16a and 16b, respectively. One input terminal of each of the AND gates 15a and 15b receives the comparison result signal CS, while the other input terminal of the AND gate 15a receives the first timing signal Sa and the other input terminal of the AND gate 15b receives the second timing signal Sb. It follows, therefore, that the output count pulses CTa and CTb from the AND gates 15a and 15b have waveforms (I) and (J) as shown, respectively, in FIG. 4. The number of pulses in both the count pulses CTa and CTb are counted by the counters 16a and 16b, respectively.

As is apparent from the above description, the count values N1a and N2a which are counted by the counter 16a and which correspond to the first halves SI 1a and SI 2a, respectively, of the first and second servo information portions SI 1 and SI 2 are equal to each other; that is $N1a = N2a = Na$. In like manner, the count values N1b and N2b which are counted by the counter 16b and which correspond to the second halves SI 1b and SI 2b are equal to each other; that is, $N1b = N2b = Nb = Nb$. When the read-out signal RS of the servo information has a constant amplitude as shown by waveform (A) in FIG. 4, the count value Na corresponding to the first halves of the servo information becomes equal to the count value Nb corresponding to the second halves; that is, $Na = Nb$. In this case, it is easily understood that the head 3 is located at the normal position of a track. Even if the head 3 is slightly deviated from the normal position, the peak values in the portions corresponding to the first and second halves of the servo information in the read-out signal RS become different from each other. Accordingly, the count values Na and Nb corresponding to the first and second halves of the servo information also become different from each other. As a result, the difference $\Delta N = Na - Nb$ represents a degree of and the direction of the deviation of the head 3 from the normal position of the track.

FIGS. 5-8 illustrate the waveforms of the read-out signals RSA of the servo information, the ramp signals TS and the comparison result signals CS, when the head 3 is positioned on various tracks. Like in FIG. 4, the left hand side in each of the figures corresponds to the first servo information SI1, while the right hand side corresponds to the second servo information SI2, and the head 3 is positioned at the normal position of each track.

Figure 5:
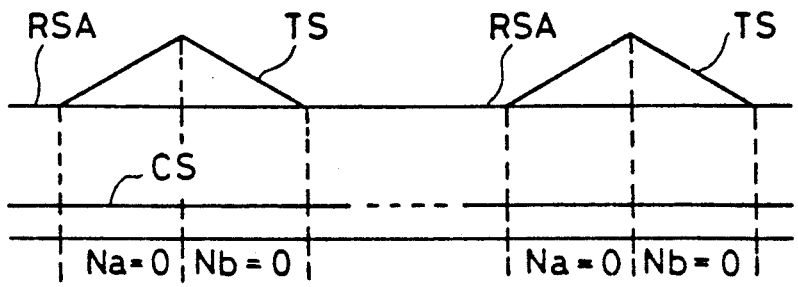
FIGS. 5-8 illustrate the waveforms of major signals in the servo information detecting circuit to explain the operation of the circuit when the read/write head is positioned on different tracks.

More particularly, FIG. 5 illustrates waveforms when the head 3 is positioned on an imaginary track having the cylinder number $CN = -2$. In this case, the amplitude of the read-out signal RSA of the servo information is zero, so that the comparison result signal CS includes no pulse at all. Consequently, the count values Na and Nb corresponding to the first halves SI1a and SI2a and to the second halves SI1b and SI2b of the first and second servo information SI1 and SI2 become zero.

Figure 6:
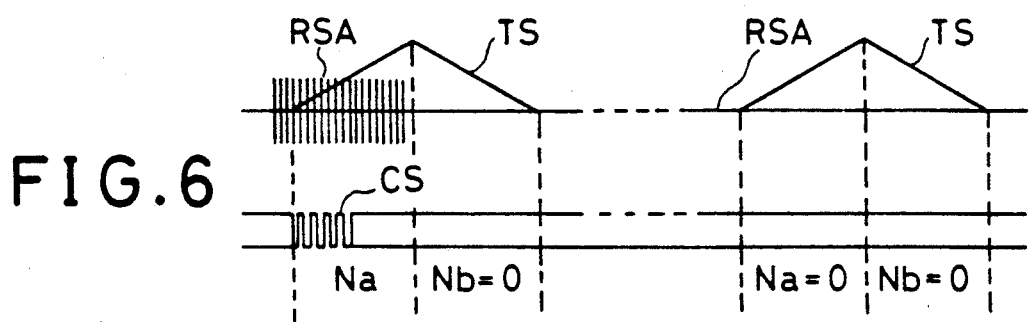

FIG. 6 illustrates waveforms when the head 3 is positioned on an imaginary track having the cylinder number $CN = -1$. In this case, only the read-out signal RSA corresponding to the first half SI1a of the first servo information SI1 exists and only the count value Na corresponding to the read-out signal RSA has a value other than zero.

Figure 7:
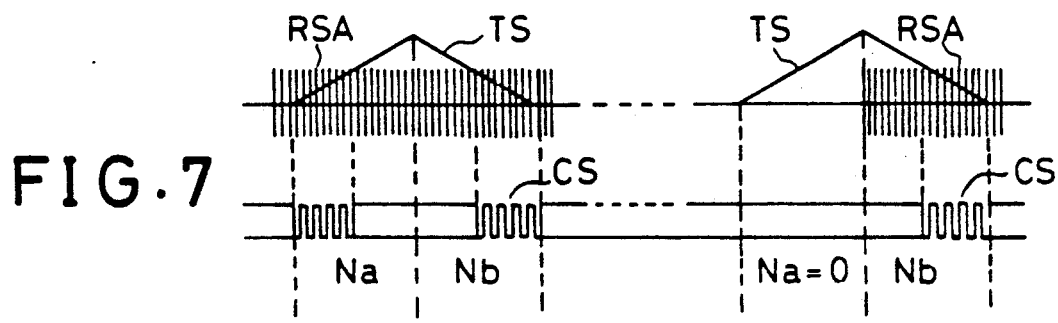

FIG. 7 illustrates waveforms when the head 3 is positioned on the reference track RT of the No. 0 track T0 having the cylinder number $CN = 0$. In this case, only the first half SI 2a of the second servo information SI 2 has no information written therein, so that only the count value Na corresponding to the first half SI 2a of the second servo information SI 2 is zero, while the remaining count values Na and Nb have values other than zero.

Figure 8:
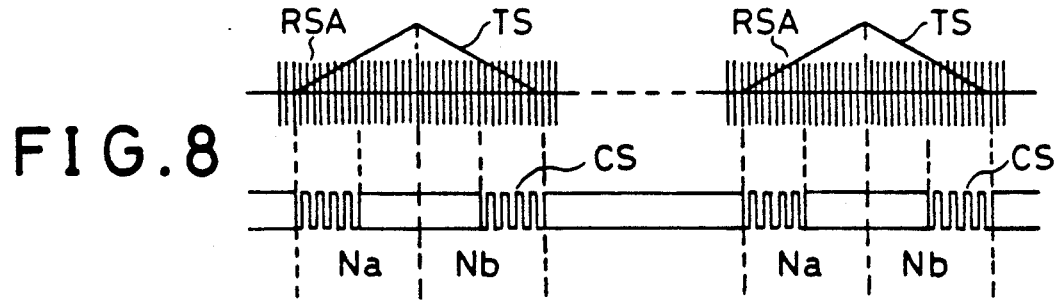

FIG. 8 illustrates waveforms when the head 3 is positioned on the track T1 or a track after the track T1 having the cylinder number CN equal to or greater than 1. In this case, Na and Nb corresponding to the first halves SI 1a and SI 2a and to the second halves SI 1b and SI 2b, respectively, of the first and second information SI 1 and SI 2 have count values other than zero. Depending upon the track position of the head 3, the count values Na and Nb corresponding to the first halves SI 1a and SI 2a and to the second halves SI 1b and SI 2b of the first and second servo information SI 1 and SI 2 vary in this manner so that the present invention detects the reference track RT by utilizing the variations in the count values Na and Nb.

Figure 9:
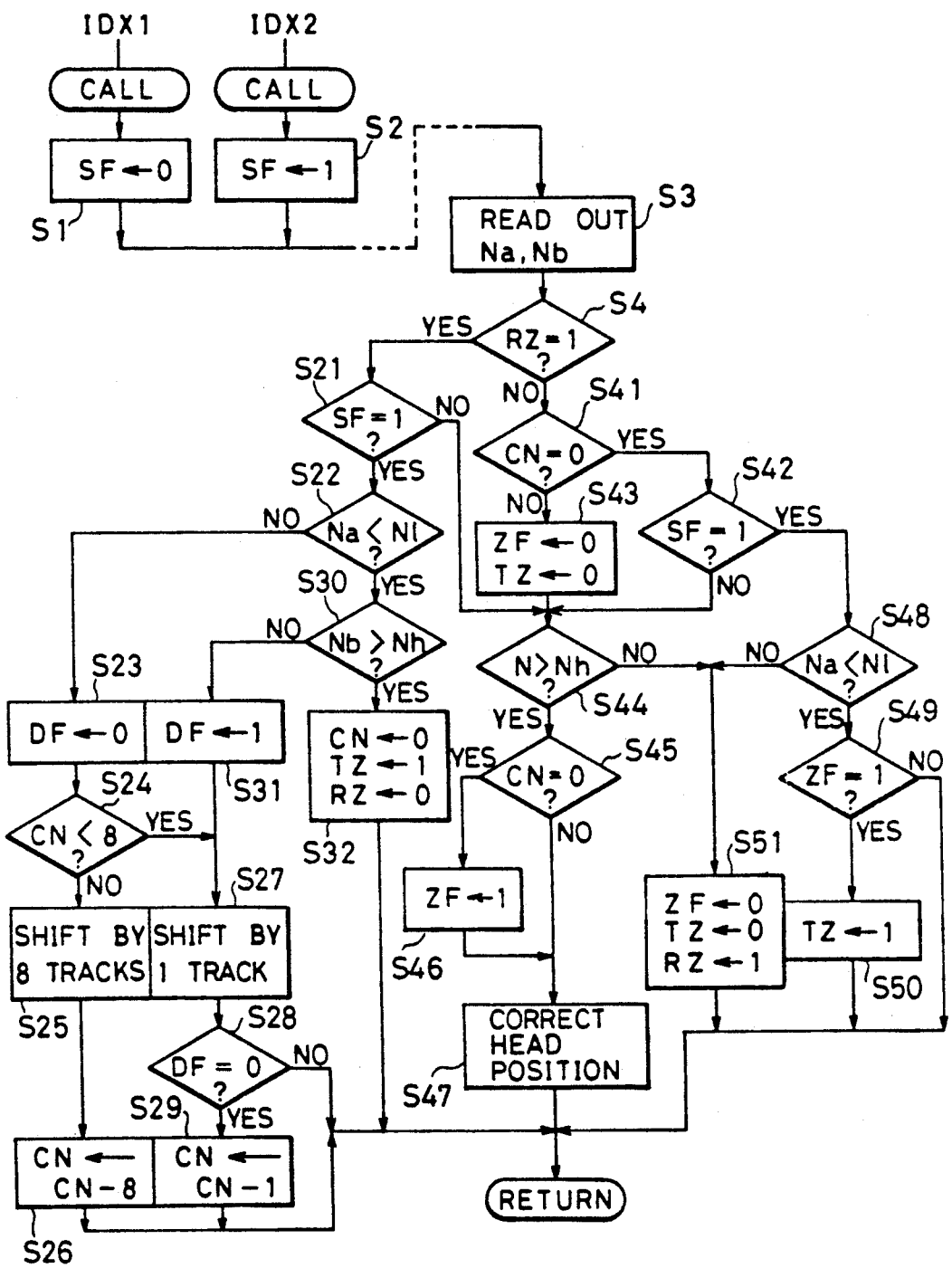
FIG. 9 is a flowchart illustrating an example of a control procedure for moving and correcting the read/write head position in response to the detection of the reference track and the detection of a deviation of the head.

Next, the overall operations of the system in accordance with the present invention will be described, mainly referring to one example of the control procedure carried out by the reference track designating means 20 shown in FIG. 9. In this control procedure, when the processor 8 receives the first index pulse IDX1 or the second index pulse IDX2 while the disc storage unit 100 is running, this control procedure starts or is called in response to the first or second index pulse IDX1 or IDX2 as an interruption instruction. As described above, when the disc storage unit 100 is started, it is necessary to detect the reference track RT. In this case, therefore, the processor 8 generates a detection instruction RZ which is "1" and transfers this instruction RZ to the reference track designating means 20. The steps from S21 to S32 in FIG. 9 are steps carried out in response to the detection instruction RZ. The steps from S41 to S51 are normal steps carried out independently of the detection instruction RZ. The steps from S1 to S4 are steps carried out in common before the two operations in steps S21–S32 and steps S41–S51 described above are executed.

In response to the first index pulse IDX1, the flowchart as shown in FIG. 9 is called and at step S1 a servo flag SF is set to "0". When the flowchart is called in response to the second index pulse IDX2, the servo flag SF is set to "1" at step S2. Thereafter, after some time delay as indicated by the broken lines, at step S3, the count values Na and Nb are read out from the servo information detecting circuit 10. The above-mentioned time delay is required for the servo-information detecting circuit 10 to detect the count values Na and Nb. At the next step S4, it is judged whether or not the detection instruction RZ is issued and whether or not the issued detection instruction RZ is set to "1". It is now assumed that the detection instruction RZ exists and the control procedure proceeds to step S21.

At step S21, it is judged whether or not the servo flag SF is "1"; that is, it is judged whether or not the present flow has been called in response to the second index pulse IDX2. When the judgement in step S21 is negative, it is judged that the present flow is called in response to the first index pulse IDX1. In this case, the reference track RT cannot be detected in response to the first servo information SI1 corresponding to the first index pulse IDX1, so the control procedure proceeds to step S44, where a normal procedure is carried out, as will be described hereinafter. On the other hand, when the judgement in step S21 is affirmative, the control procedure proceeds to step S22, since the count values Na and Nb corresponding to the second servo information SI 2 have been already read out in previous step S3.

At step S22, it is judged whether or not the value Na corresponding to the first half SI 2a of the second servo information SI 2 is smaller than a predetermined small threshold value N1. It is now assumed that the head 3 is initially positioned on a track located radially inwardly of the reference track RT, when the detection instruction RZ is issued. Thus, the judgement in step S22 is negative, and consequently the control procedure proceeds to step S23. In step S23, in order to select the direction of displacement of the head 3 to the radially outward direction, a direction flag DF is set to "0" and at the next step S24, it is judged whether or not the cylinder number CN now stored is smaller than, for instance, 8. If the stored cylinder number CN is equal to or larger than 8, the procedure goes to step S25. At step S25, the processor 8 supplies the drive instruction DS to the driving circuit 5a of the actuator 5, so that the head 3 is moved in the radially outward direction by tracks. It is, of course, apparent that the displacement of the head 3 by a plurality of tracks is to shorten the detection time for detecting the reference track RT. At subsequent step S26, the stored cylinder number CN is decremented by 8. Thus, the present flow is accomplished.

When it is judged that the stored cylinder number CN is smaller than 8 at step S24, the control procedure proceeds to step S27, in which the head 3 is shifted radially outwardly by one track and at next step S28 it is judged whether or not the direction flag DF is "0". When the judgement in step S28 is affirmative, the procedure proceeds to step S29, in which the stored cylinder number CN is decremented by 1. Then, the flow is terminated.

In response to each reception of the second index pulse IDX2, the control procedure goes to step S22 from step S21. Then, the above-described flow is repeatedly executed. When the head 3 is sequentially shifted by eight tracks or one track, so that it is positioned on the reference track RT, the value Na, corresponding to the first half SI 2a of the second servo information SI 2, is less than the threshold value N1. As a result, the judgement in step S22 is affirmative, so that the procedure proceeds to step S30.

When the head 3 is properly positioned on the reference track RT, the value Nb, corresponding to the second half SI 2b of the second servo information SI 2, must have a value other than zero. Thus, at step S30, in order to confirm this fact, it is judged whether or not the value Nb is greater than a relatively high threshold value Nh. Usually, the result of the judgement made at step S30 must be affirmative. But, sometimes it may happen that the head 3 is initially located radially outwardly of the reference track RT. In this case, the judgement at step S30 is negative. In the latter case, the control procedure moves to step S31, in which in order to designate the radially inward movement of the head 3, the direction flag DF is set to "1" and then the control procedure proceeds to step S27. In step S27, in accordance with the state of the direction flag DF, the head 3 is moved radially inwardly by one track and then in next step S28, the direction flag DF is set to "1", and accordingly the flow is terminated without proceeding to step S29.

As described above, even if the head 3 is initially positioned radially outwardly of the reference track RT, the judgement result in step S30 is affirmative when the head 3 is positioned on the reference track RT by sequentially displacing the head 3 radially inwardly. As a result, the control procedure goes to step S32. In step S32, the stored cylinder number CN is first set to zero, so that the operation for detecting the reference track RT is substantially terminated. But, in this embodiment, the track-zero signal TZ is set to "1". This track-zero signal TZ of "1" is informed from the processor 8 of the disc storage unit 100 to the controller 110, so that the controller 110 can recognize the termination of the detection of the reference track RT. In this embodiment, in steps S32, the detection instruction RZ is set to "0" to erase this instruction RZ, whereby the whole operation for detecting the reference track RT is terminated.

As described above, according to the present invention, in response to the value detected by the servo information detecting means 20, the deviation of the head 3 from its normal position of a track is detected, so that the position of the head 3 is corrected. A flow associated with this correction and starting from step S41 will be described hereinafter.

In step S41, it is judged whether or not the stored cylinder number CN is 0, and when the judgement is affirmative, it is further judged in next step S42 whether or not the servo flag SF is in the "1" state. When the judgement in step S41 is negative, the zero-track flag ZF is set to "0" and furthermore the track-zero signal TZ is set to "0" by way of precaution and then the control procedure moves to step S44. When the judgement in step S42 is negative, the control procedure goes to step S44. Accordingly, if the stored cylinder number CN is zero and the values Na and Nb, corresponding to the second servo information SI 2, have not been already read out in the previous step S3, the control procedure moves to step S44. In step S44, it is judged whether the count values Na and Nb which are represented in general by N are higher or lower than the threshold value Nh. Normally, the judgement in step S44 is affirmative, so that control procedure shifts to step S45. In step S45, if the stored cylinder number CN is zero, the zero-track flag ZF is set to "1" in step S46. Subsequently, and also when the judgement in step S45 is negative, the control procedure enters step S47 from steps S46 and S45, respectively, to correct the position of the head 3. In step S47, the deviation of the head 3 from the normal position of a track is computed in the manner described hereinbefore based on $\Delta N = Na - Nb$ and in order to eliminate such deviation as usual, the processor 8 supplies the drive instruction DS to the driving circuit 5a of the actuator 5 to displace and correct the head 3 to the normal position. As is apparent from the above description, according to the present invention, the correction of the position of the head 3 is carried out not only in response to the first servo information SI 1, but also in response to the second servo information SI 2 unless the head 3 is properly positioned on the reference track RT.

Meanwhile, when the judgement in step S42 is affirmative; that is, when the result of the judgement made in the preceding step S41 indicates that the stored cylinder number CN is zero so that the head 3 is properly positioned on the reference track RT and the servo flag SF is in the "1" state so that the second servo information SI 2 is being read out, the control procedure proceeds to step S48. In step S48, it is confirmed that the value Na corresponding to the first half SI 2a of the second servo information SI 2 is smaller than the threshold value N1. In the normal case, the judgement is affirmative, so that the control procedure proceeds to step S49.

In step S49, it is judged whether or not the zero-track flag ZF is in the "1" state. When the judgement is affirmative, it is confirmed that the head 3 is definitely properly positioned on the reference track RT, since it was confirmed in previous steps S44 and S45 that the stored cylinder number CN is zero, and that there exists a numerical value corresponding to the first servo information SI 1, and after the confirmation, the zero-track flag ZF is set to "1".

Thus, in next step S50, the track-zero signal TZ is set to "1" and the processor 8 informs the controller 110 that the head 3 is properly positioned on the reference track RT. When the judgement in step S49 is negative, so that it has not been confirmed yet that the numerical value corresponding to the first servo information SI1 is normal, the control procedure is temporarily terminated without setting the track-zero signal TZ to "1".

As is easily understood, the following alternative is possible. That is, the zero-track flag ZF is set to "1" and subsequently when the judgement in step S45 is affirmative, the track-zero signal TZ is set to "1", under the condition that the zero-track flag ZF is in the "1" state.

The judgement in steps S44 and S48 must be always affirmative in the normal case, but due to some cause, for example, if the stored cylinder number CN is not correct, it may happen that the judgement is negative. Step S51 deals with such abnormal state. That is, after the zero track flag ZF and the track zero signal TZ are set to "0" by way of precaution, the detection instruction RZ is set to "1" in this embodiment. That is, in order to eliminate such abnormal state, the disc storage unit 100 is instructed to detect the reference track RT. Thereafter, when the servo information arrives, the control procedure returns to the procedure from step S21.

As described above, according to the present invention, even if no detection instruction RZ exists, the track zero signal TZ representing that the head 3 is properly positioned on the reference track RT is generated, after it is sufficiently confirmed that the numerical value corresponding to the first servo information SI 1, and the numerical value corresponding to the second servo information SI 2, which are detected by the servo information detecting circuit 10 when the head 3 is supposed to be properly positioned on the reference track RT, are normal. Thus, when some abnormal state is detected, the abnormal state can be corrected.

While the description of the embodiments of the present invention has been completed, it is to be understood that the present invention is not limited to the above-described embodiments and that various modifications can be effected within the true spirit of the present invention.

For instance, when the reference track RT is defined outwardly of the data tracks, it is not necessarily required to write servo information into a plurality of spaces spaced apart from each other in the peripheral or circumferential direction of the disc. Furthermore, when the servo information consists of three, or more than three portions, and the servo information detecting circuit 10 is so arranged to generate the corresponding number of numerical values, the detection of the reference track RT and the detection of the deviation of the head 3 from the normal position of a track can be always simultaneously carried out, even if there is only one type of servo information. Even when a plurality of types of servo information are written, it is not necessarily required to write all the types of the servo information on the same surface of the disc. If the head 3 is suitably selectively switched, the servo information may be distributed to and written into the different surfaces of the disc.

In addition, the operational flow of the reference track designating means 20 can be carried out in various manners, and furthermore, the degree of accuracy of the detection of the reference track RT, and the degree of accuracy of the confirmation of the stored cylinder number CN, can be suitably selected in accordance with such requirement.

As described above, in the reference track detecting system for the disc storage unit 100 in accordance with the present invention, the servo information, which is written on the surface of the disc in order to detect the deviation of the head 3 from the normal position of each track, consists of a plurality of portions and the content of the servo information to be written in the reference track RT is made different from those written in other tracks. In addition, there is provided the servo information detecting circuit 10 for detecting a plurality of numerical values representative of the contents of the respective portions of the servo information in response to the read-out signal of the servo information obtained from the head 3, and in accordance with a plurality of numerical values thus detected, the reference track RT is discriminated from other tracks, so that the reference track RT is specified.

In this manner, according to the present invention, the reference track RT, based on which the read/write head 3 is displaced and positioned on each of a plurality of tracks defined on the surface of the disc to write and read out the data into and from the track, is detected by utilizing the head 3 itself, so that the reference track RT can be correctly detected without using a position sensor exclusively used heretofore for detecting only the reference track RT. As a result, the extra cost required heretofore for the position sensor, and for installing the position sensor in the disc storage unit, can be reduced, and furthermore, the space required for the installation of the position sensor can be completely eliminated. Moreover, the troublesome adjustment of the position of the position sensor can be also eliminated.

As is clear from the above-described embodiments, the present invention can be carried out by slightly modifying the output mode of a conventional servo information detecting circuit in such a way that a plurality of numerical values are outputted. As a result, when the present invention is embodied in a conventional disc storage unit, the above-described advantageous effects and features can be attained substantially without increasing its cost.

As described above, according to the present invention, the arrangement of a disc storage unit can be rationalized and as is clear from the above-mentioned embodiment, when the present invention is applied to a disc storage unit, operation reliability can be increased. In addition to the increase in safety against vibration, oscillation and impact, the performance of a disc storage unit can be enhanced.

The invention has been described in detail with respect to embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A system for detecting a reference track defined on a main surface of a rotatable disc in a disk storage unit, said disc having a plurality of tracks defined on the main surface of said disc, comprising:

a read/write head for reading out and/or writing data information from and/or onto the main surface of said disc;

head position control means for controlling the position of said read/write head;

said disc further including: at least two servo information portions for each track, each of said at least two servo information portions for detecting a deviation of said read/write head from a normal position in each of said tracks, and each of said at least two servo information portions having a first half and a second half, said at least two servo information portions being recorded on said main surface of said disc in patterns such that both said first half and second half are staggered from each other in both radial and circumferential directions and are displaced on opposite sides with respect to a center line of each of said tracks, respectively, in a radial direction, said patterns being arranged repeatedly in a radial direction of said main surface of said disc;

said reference track having reference track servo information comprised of at least two servo information portions having a first and second half, one of said at least two servo information portions having one of either the first half or the second half blank;

a read/write circuit for reading out and/or writing data information from and/or onto said main surface of said disc through said read/write head;

a triangular wave generator for generating a triangular waveform signal which is synchronized with a timing signal such that when said read/write circuit reads data information, said triangular waveform signal rises when the first half of each of said servo information portion is read out, and falls when the second half is read out;

a comparator for comparing said triangular waveform signal with a servo information signal read out by said read/write circuit and outputting an output containing pulses signal;

counting means for counting the number of pulses contained in said output signal from said comparator during a time period corresponding to said first half of each of said at least two servo information portions to output a first count value, and said counting means also for counting the number of pulses contained in an output from said comparator during a time period corresponding to said second half of each of said at least two servo information portions to output a second count value;

head position correcting means for detecting a deviation of said head from the normal position in accordance with a difference between said first and second count values output from said counting means, and outputting a deviation signal, said deviation signal being supplied to said head position control means to correct the position of said head;

servo information judgment means for judging whether or not said first and second count values indicate detection of reference track servo information when a reference track detection instruction is applied to said system, and for controlling said head position control means to correct the position of said head when said first and second count values do not indicate detection of reference track servo information;

first comparison means for comparing the count value from said counting means which corresponds to one half, which is blank, of said first and second halves of said reference track servo information, with a first predetermined threshold value;

second comparison means for comparing the count value from said counting means which corresponds to one half which is not blank, of said first and second halves of said reference track servo information, with a second predetermined threshold value; and reference track signal providing means for providing a reference track signal if said first and second count values indicate detection of said reference track servo information, and if a comparison result from said first comparison means indicates that said count value is smaller than said first threshold value, and if a comparison result from said second comparison means indicates that said count value is greater than said second threshold value.

2. A system as claimed in claim 1, further comprising deviation detecting means for detecting the deviation of said read/write head from the normal position of each track in accordance with the count values from said counting means.

3. A system as claimed in claim 2, wherein said reference track is defined in data tracks for recording said data information.

4. A system as claimed in claim 3, wherein said plurality of servo information portions are distributed and spaced apart from each other in the circumferential direction of said surface of said disc.

5. A system as claimed in claim 4, wherein said plurality of servo information portions are arranged on the same surface of said disc.

6. A system as claimed in claim 4, wherein said plurality of servo information portions are formed by two servo information portions.

7. A system as claimed in claim 2, wherein said reference track is defined independently of data tracks for recording data information.

8. A system as claimed in claim 7, wherein said reference track is arranged adjacent to one of said data tracks.

9. A servo information detection system, for use in a disk system having at least one disk on which information is readable and writable by at least one read/write head, for detecting servo information divided into a first half and a second half, comprising:

amplifying means for amplifying a read-out servo information signal having servo information with a plurality of positive peaks from a read/write circuit and supplying an amplified signal at an output;

timing signal generating means for producing at least three output signals from a first index pulse signal, a first of said at least three output signals being a second index pulse signal, a second of said at least three output signals being a first timing signal having a pulse width substantially corresponding to the width of said first half of said servo information, and a third of said at least three output signals being a second timing signal having a pulse width substantially corresponding to the width of said second half of said servo information;

triangle waveform generation means for receiving at least said first and said second timing signals from said timing signal generating means, and for producing at an output a triangular ramp signal which rises in synchronism with said first timing signal and falls in synchronism with said second timing signal;

comparing means for comparing said amplified signal from said amplifying means to said triangular ramp signal and outputting a comparison signal, said comparison signal having pulses, the number of which equals the number of positive peaks in said amplified signal whose level exceeds the level of said triangular ramp signal;

a first separating means, operatively connected to receive said comparison signal and said first timing signal, for separating the number of pulses in said comparison signal which correspond to the positive peaks of said first half of said servo information signal read out and supplying a first separated signal at an output;

a second separating means, operatively connected to receive said comparison signal and said second timing signal, for separating the number of pulses in said comparison signal which correspond to the positive peaks of said second half of said servo information signal read out and supplying a second separated signal at an output;

first counting means for counting the pulses in said first separated signal, separated by said first separating means, and outputting a first count signal;

second counting means for counting the pulses in said second separated signal, separated by said second separating means, and outputting a second count signal;

processing means for receiving and analyzing said first index pulse signal, said second index pulse signal, and said first and second count signals, and for controlling said system based on the analysis in order to at least: (1) determine if the at least one read/write head is properly positioned relative to tracks on said at least one disk, (2) determine if said at least one read/write head is positioned over a reference track on said at least one disk, and (3) correct the position of said at least one read/write head.

* * * * *